UNITED STATES PATENT OFFICE.

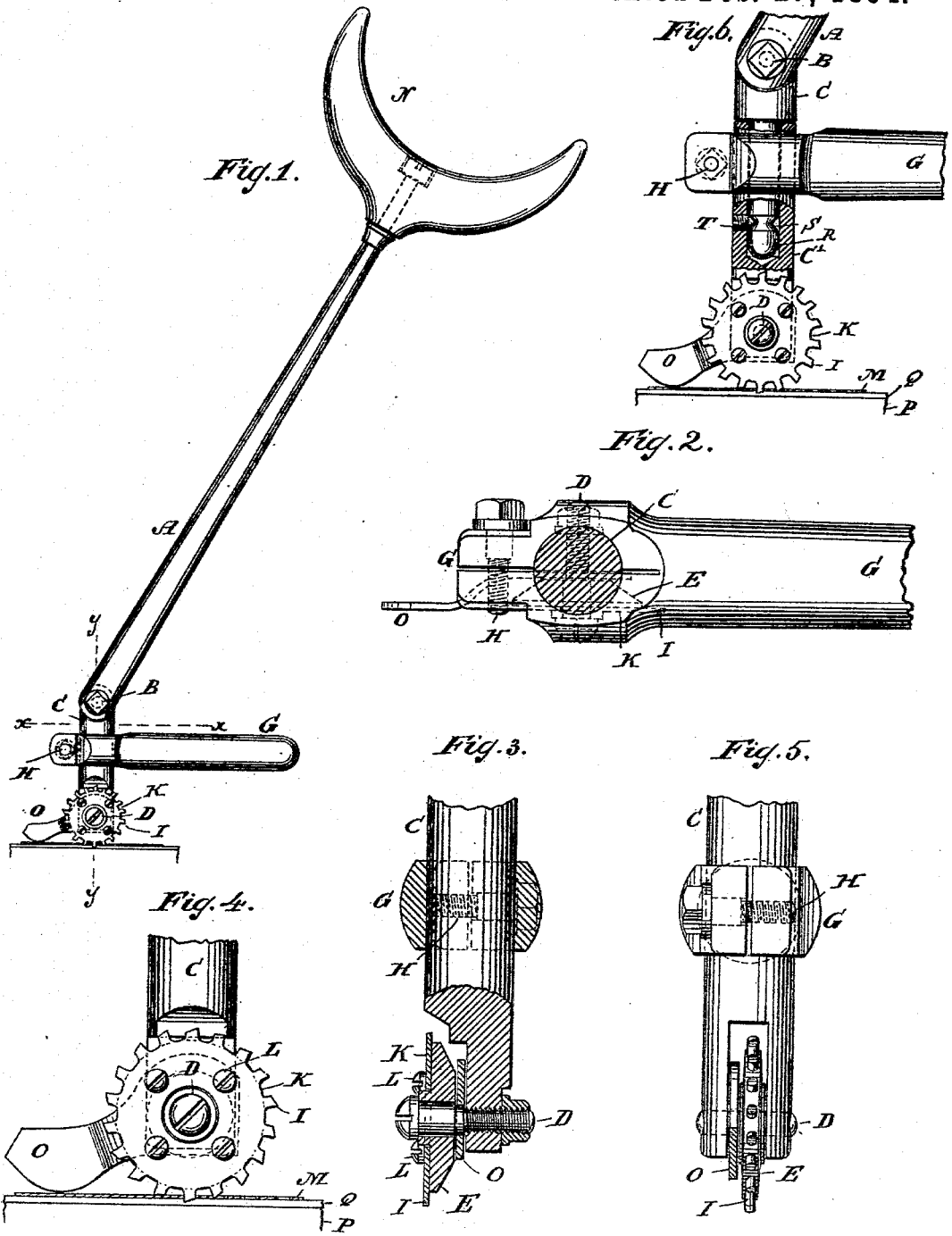

HENRY WARTH, OF STAPLETON, NEW YORK.

PERFORATING-TOOL.

SPECIFICATION forming part of Letters Patent No. 515,633, dated February 27, 1894.

Application filed August 25, 1892. Serial No. 444,144. (No model.)

*To all whom it may concern:*

Be it known that I, HENRY WARTH, a citizen of the United States, residing at Stapleton, in the county of Richmond and State of New York, have invented new and useful Improvements in Perforating-Tools, of which the following is a specification.

This invention relates to an improvement in perforating tools and the invention consists in certain novel features pointed out in the following specification and claims and illustrated in the annexed drawings, in which—

Figure 1, is a side elevation of the device. Fig. 2, is a section along $x\,x$ Fig. 1. Fig. 3, is a section along $y\,y$ Fig. 1. Fig. 4, is a detail side elevation of the marking wheel. Fig. 5, is a front elevation of a modification. Fig. 6, is a side elevation of another modification.

In the drawings the letter A indicates a shank having its lower portion jointed or pivoted thereto at B to form a bearing or arm C for the shaft D of the marking tool or wheel E. From the shank extends a handle or handle portion G having a fastening or setscrew H. The marking wheel E has the teeth or pins I which may be of various shapes as for example flat or blade like (Fig. 1) or circular (Fig. 5). In Fig. 5 the teeth I are shown integral with or fixed to the wheel E. In Figs. 1 to 4 the teeth I extend from a disk or plate K secured by screws or fastenings L to the wheel or disk E. Each of said teeth at its outer end is formed into or provided with a cutting edge or face extending unbrokenly entirely across the tooth in a continuous inclined or oblique direction. By having the cutting edge inclined from the front of the tooth backward toward the center of the marking wheel the tooth will come readily out of the hole punched by said tooth as the wheel travels along and the rear edge of said tooth will not be apt to catch or stick against the edge of said hole. By the front of the tooth is meant that edge of the tooth facing toward the index O when the tooth is resting on the material to be treated, said front edge as seen being longer than the rear edge of the tooth by reason of the cutting edge being inclined from the front edge backward toward the center of the wheel.

The guide or index O is shown in Fig. 3 as loosely mounted about or made to swing on the shaft or axle D, so that said index will drop at its front or free part or end, and rest or slide on the material acted on by the tool, as seen in Fig. 4.

The arm rest N is swiveled on the upper end of shank A and by being placed in the arm pit said rest N enables the operator to readily exert the necessary pressure while leaving the hands free.

A guide or index O is so placed as to be readily visible to the operator and enable the wheel to be kept on its proper course.

In cutting or forming a pattern the paper or material M for the pattern is placed upon a table or support P having a covering Q of soft material such as rubber so that when the teeth I run over the material under pressure they will shear or cut perforations entirely through the material to form the pattern or outline.

The lower portion of shank A forming the bearing C instead of being jointed to the shank A might be fixed thereto at the proper angle or the bearing C and shank A might be cast or formed in one piece. Said bearing portion C might be cast or formed in a straight line with the main portion A of the shank but an angular position is more convenient as enabling the operator to attain a greater reach.

The bearing in Fig. 6 is shown composed of two parts C C', the part C' being made to swivel on the part C.

The stem R having groove S engaged by screws T secures the parts C C' to one another while allowing part C' to swivel on part C. In case the bearing is provided with a swivel part the arm pit rest N instead of being swiveled is preferably fixed on shank A.

What I claim as new, and desire to secure by Letters Patent, is—

1. A perforating tool, consisting of a shank having its lower portion jointed and formed into a bearing, a marking wheel carried by the bearing, a handle made to extend from the jointed bearing, and an arm-pit rest carried by the shank, substantially as described.

2. A perforating tool, consisting of a shank provided with an arm-pit rest and having at its lower portion a bearing formed in two parts C C', one of said bearing parts swiveling on the other and the swiveling part carrying a marking-wheel and a handle, substantially as described.

In testimony whereof I have hereunto set my hand in the presence of two subscribing witnesses.

HENRY WARTH.

Witnesses:
WM. C. HAUFF,
E. F. KASTENHUBER.